(12) United States Patent
Kimmerly et al.

(10) Patent No.: US 12,270,751 B2
(45) Date of Patent: Apr. 8, 2025

(54) SYSTEMS AND METHODS FOR WILDFIRE SMOKE GENERATION AND ELECTRONICS TESTING

(71) Applicant: UL LLC, Northbrook, IL (US)

(72) Inventors: Veronica Kimmerly, Northbrook, IL (US); Gregory Sutter, Lake Villa, IL (US)

(73) Assignee: UL LLC, Northbrook, IL (US)

( * ) Notice: Subject to any disclaimer, the term of this patent is extended or adjusted under 35 U.S.C. 154(b) by 262 days.

(21) Appl. No.: 17/968,961

(22) Filed: Oct. 19, 2022

(65) Prior Publication Data
US 2024/0133795 A1 Apr. 25, 2024
US 2024/0230511 A9 Jul. 11, 2024

(51) Int. Cl.
*G01N 17/00* (2006.01)
*A62C 37/50* (2006.01)

(52) U.S. Cl.
CPC ........... *G01N 17/002* (2013.01); *A62C 37/50* (2013.01)

(58) Field of Classification Search
None
See application file for complete search history.

(56) References Cited

U.S. PATENT DOCUMENTS

| | | | |
|---|---|---|---|
| 5,670,946 | A | 9/1997 | Ellwood et al. |
| 7,852,227 | B2 | 12/2010 | Pepper et al. |
| 9,247,584 | B2 | 1/2016 | Fabian et al. |
| 10,309,868 | B2 | 6/2019 | Rauschenberg et al. |
| 11,029,239 | B2 | 6/2021 | Littley et al. |
| 2021/0295676 | A1 | 9/2021 | Fazzio |
| 2022/0099644 | A1 | 3/2022 | Ajay |

FOREIGN PATENT DOCUMENTS

| | | | | |
|---|---|---|---|---|
| CN | 115126602 A | * | 9/2022 | |
| CN | 115241767 A | * | 10/2022 | |
| CZ | 303988 B6 | * | 7/2013 | ............ A62C 37/50 |
| WO | 2002012861 A1 | | 2/2002 | |

* cited by examiner

*Primary Examiner* — Peter J Macchiarolo
*Assistant Examiner* — Jermaine L Jenkins
(74) *Attorney, Agent, or Firm* — Greenberg Traurig, LLP

(57) ABSTRACT

A first chamber is configured to generate smoke from combustion of a combustible material within the first chamber. A second chamber is configured to house an electronic device. The first chamber and the second chamber are fluidly connected. The apparatus further includes an air pump configured to move the smoke generated in the first chamber into the second chamber. While the air pump is in operation, the electronic device in the second chamber is exposed to the smoke generated in the first chamber. The second chamber is further configured with an exhaust such that the smoke generated in the first chamber moves through the second chamber and out of the second chamber via the exhaust.

18 Claims, 10 Drawing Sheets

FIG. 4A
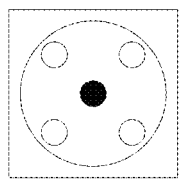
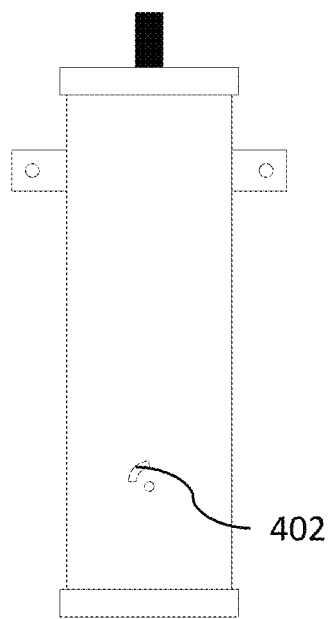
402
FIG. 4B
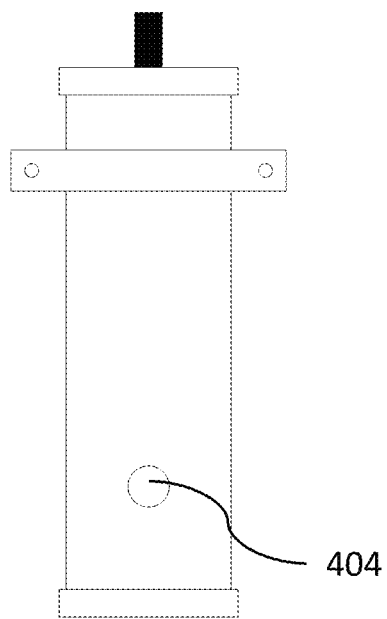
404
FIG. 4C
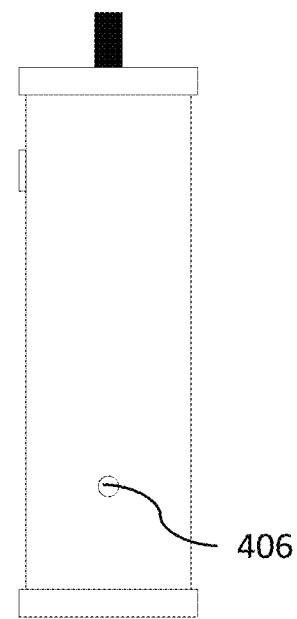
406
FIG. 4D

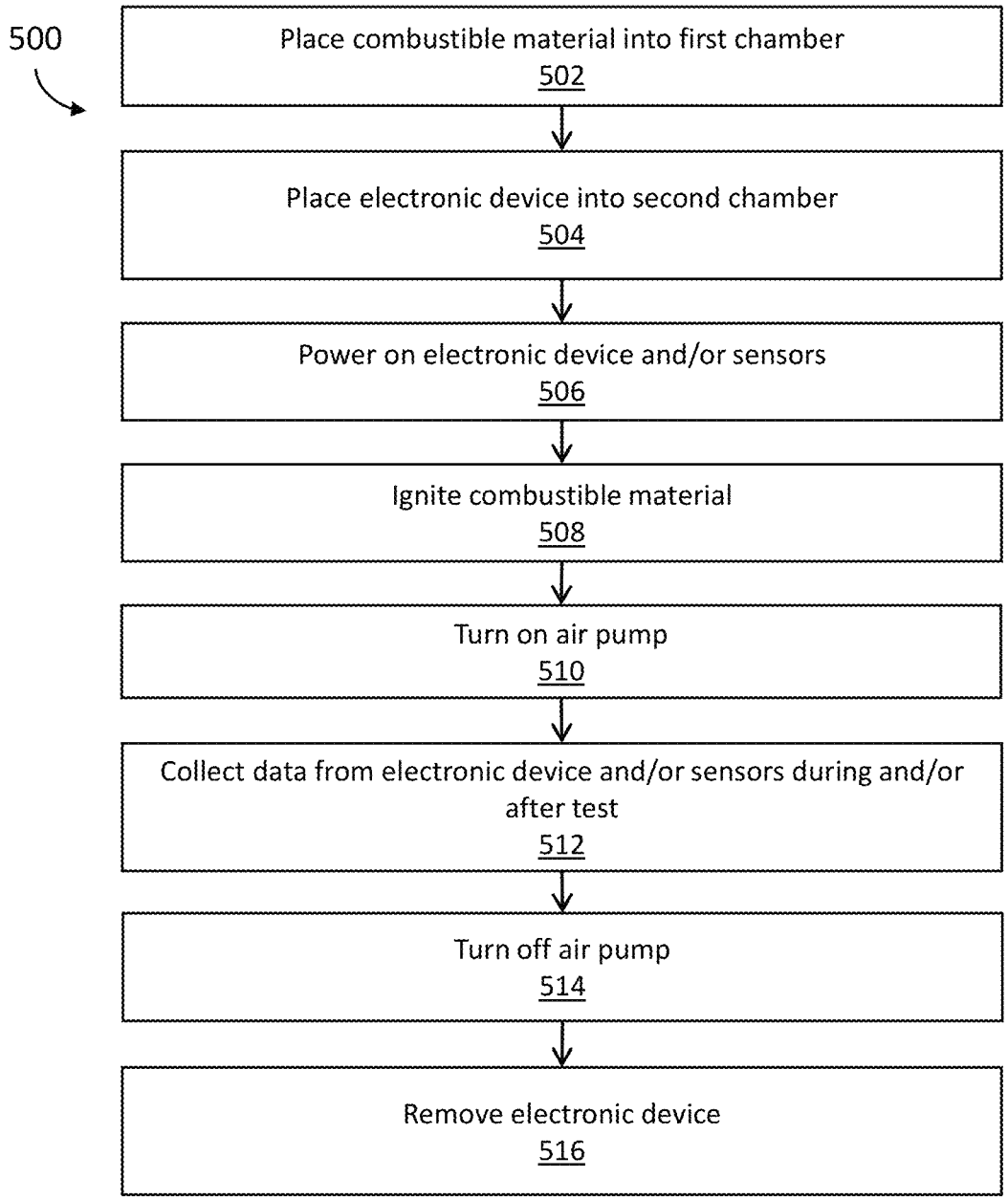

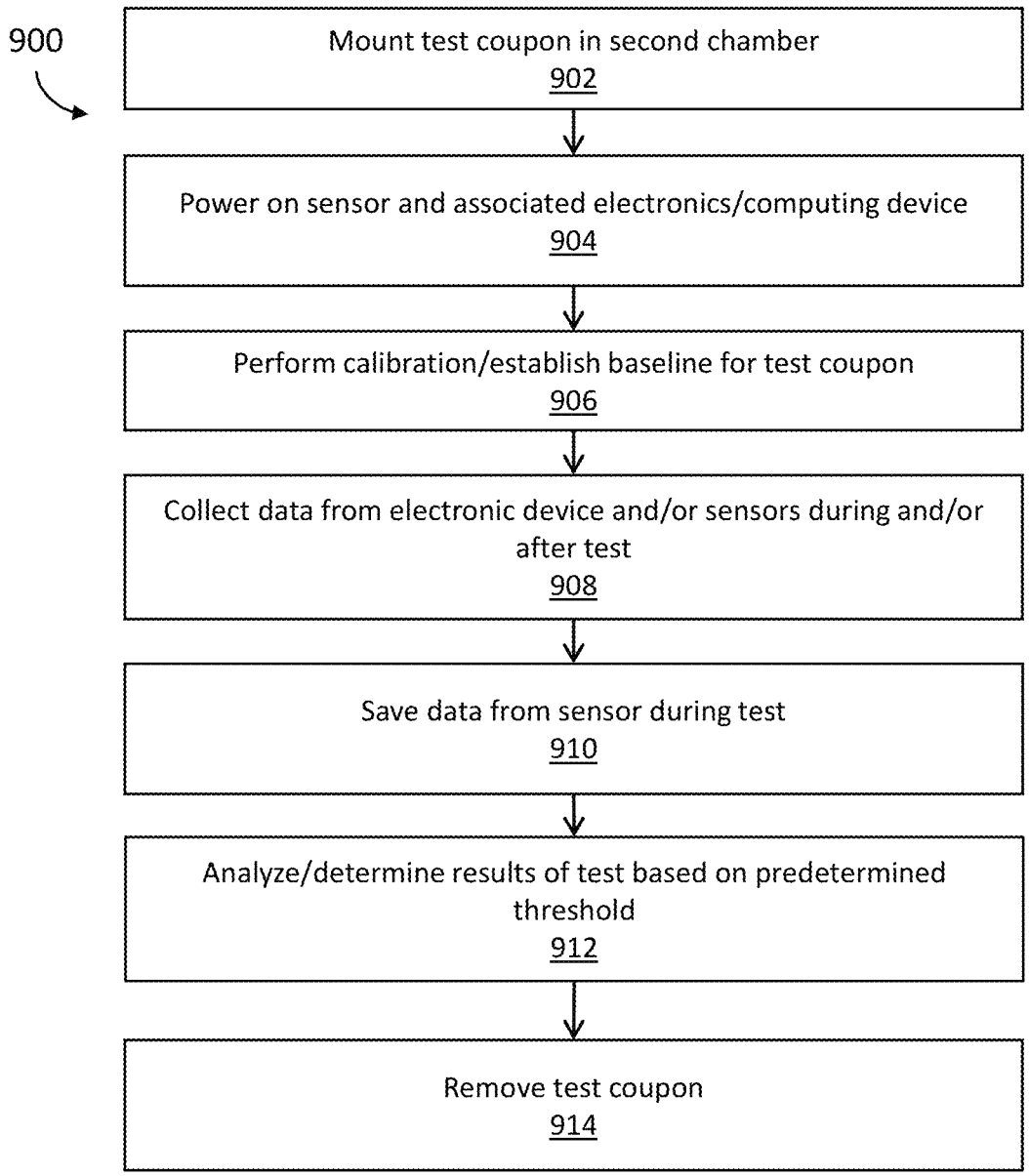

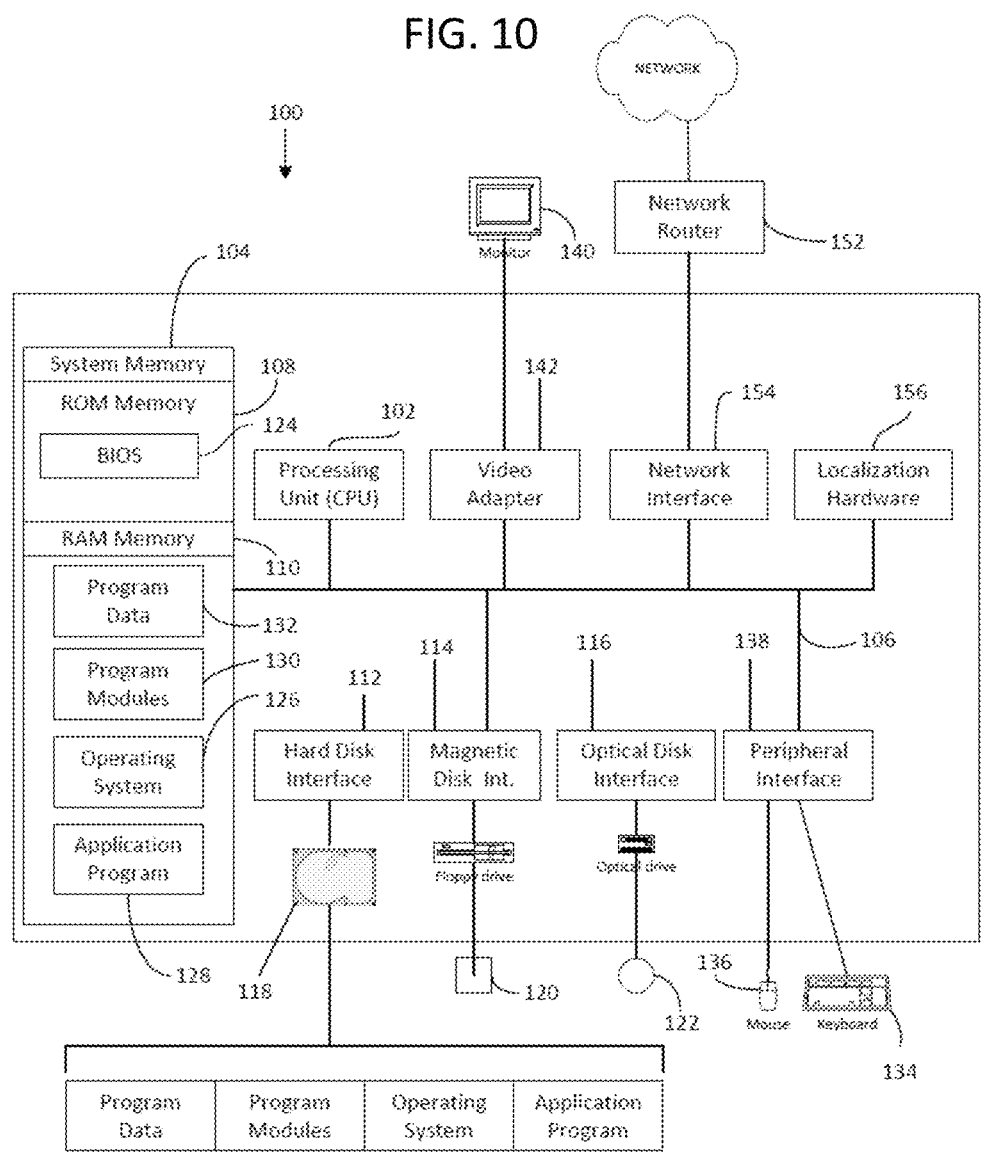

SYSTEMS AND METHODS FOR WILDFIRE SMOKE GENERATION AND ELECTRONICS TESTING

BACKGROUND

Wildfires or other fires emit large amounts of smoke, which can include particulate material. Wildfires may also occur with increasing frequency in the presence of drought conditions, as average heat increases in a particular geographic area, etc. The smoke produced by wildfires can cause weather changes, increased pollution/smog, and other negative impacts in areas where the smoke drifts from a wildfire.

SUMMARY

An illustrative apparatus includes a first chamber configured to generate smoke from combustion of a combustible material within the first chamber. The apparatus further includes a second chamber configured to house an electronic device. The first chamber and the second chamber are fluidly connected. The apparatus further includes an air pump configured to move the smoke generated in the first chamber into the second chamber. While the air pump is in operation, the electronic device in the second chamber is exposed to the smoke generated in the first chamber. The second chamber is further configured with an exhaust such that the smoke generated in the first chamber moves through the second chamber and out of the second chamber via the exhaust.

An illustrative method for exposing an electronic device to smoke to test the electronic device includes placing combustible material into a first chamber and placing the electronic device into a second chamber. The first chamber and the second chamber are fluidly connected. The method further includes igniting the combustible material in the first chamber to generate smoke form the combustible material. The method further includes turning on an air pump to move the smoke from the first chamber to the second chamber. The method further includes collecting data from at least one sensor in the second chamber while the air pump is on. The air pump is on for at least a predetermined amount of time for the test.

An illustrative apparatus includes a smoke generation portion configured to house combustible material and output smoke upon combustion of the combustible material. The apparatus further includes a test portion configured to house an electronic device. The smoke generation portion and the test portion are fluidly connected. The smoke generation portion and the test portion are configured to expose the electronic device to the smoke.

BRIEF DESCRIPTION OF THE DRAWINGS

FIGS. 4A-D are diagrammatic views of a top, front, rear, and left side, respectively of a chamber used to generate smoke, in embodiments.

FIG. 5 is a flow chart illustrating an example method for generating smoke and exposing an electrical device to that smoke, in embodiments.

FIG. 9 is a flow chart illustrating an example method for performing a test using an electrical leakage device, in embodiments.

FIG. 10 is a diagrammatic view of an example of a computing environment, in embodiments.

DETAILED DESCRIPTION

The following disclosure of example methods and apparatus is not intended to limit the scope of the detailed description to the precise form or forms detailed herein. Instead the following disclosure is intended to be illustrative so that others may follow its teachings.

Wildfire smoke can disseminate over wide areas due to their size, weather patterns such as wind, etc. Since smoke from fires such as wildfires also includes particulate matter of varying sizes, that particulate matter can also be spread over wide geographical areas. Particles from wildfire smoke can cause damage to various types of devices, such as computing or other electronic or electrical devices. Even devices indoors or enclosed may not be protected from wildfire smoke damage, as ventilation systems may not filter all particles out, or particles may get inside of buildings or storage containers in other ways.

Particles in wildfire smoke may cause damage to computer and electronic/electrical devices in various ways. Particles may be jagged and cause scratching or other physical damage. Particles may also cause other types of damage or malfunctions. For example, if particles from wildfire smoke get into optical devices, the transmissibility of light in those devices may be reduced due to the presence of particles from the wildfire smoke. Particles from wildfire smoke may also may be electrically conductive or partially electrically conductive. As a result, if particles settle onto electronics such as circuit boards or wiring, the particles may cause shorts between electrical components or other failures due to the present of conductive material in an undesirable location in a device.

Wildfire smoke therefore poses a risk to the proper functioning of many different types of devices, such as devices commonly used in communications such as internet communications, data centers, etc. As such, described herein are methods and systems for generating wildfire smoke or approximating wildfire smoke by burning organic combustible materials in a controlled setting, exposing electronics to that smoke, and measuring characteristics of the smoke and/or the electronics behavior in response to the smoke. Such testing apparatuses, systems, methods, and computer readable media as described herein provide electronics manufacturers, for example, a way to test their electrical equipment prior to use in the field where those devices must be relied on. In other words, electronic devices may be tested to see how well they function in the presence of smoke such as wildfire smoke or smoke with similarly sized and typed particulate matter to wildfire smoke.

Figure 1:
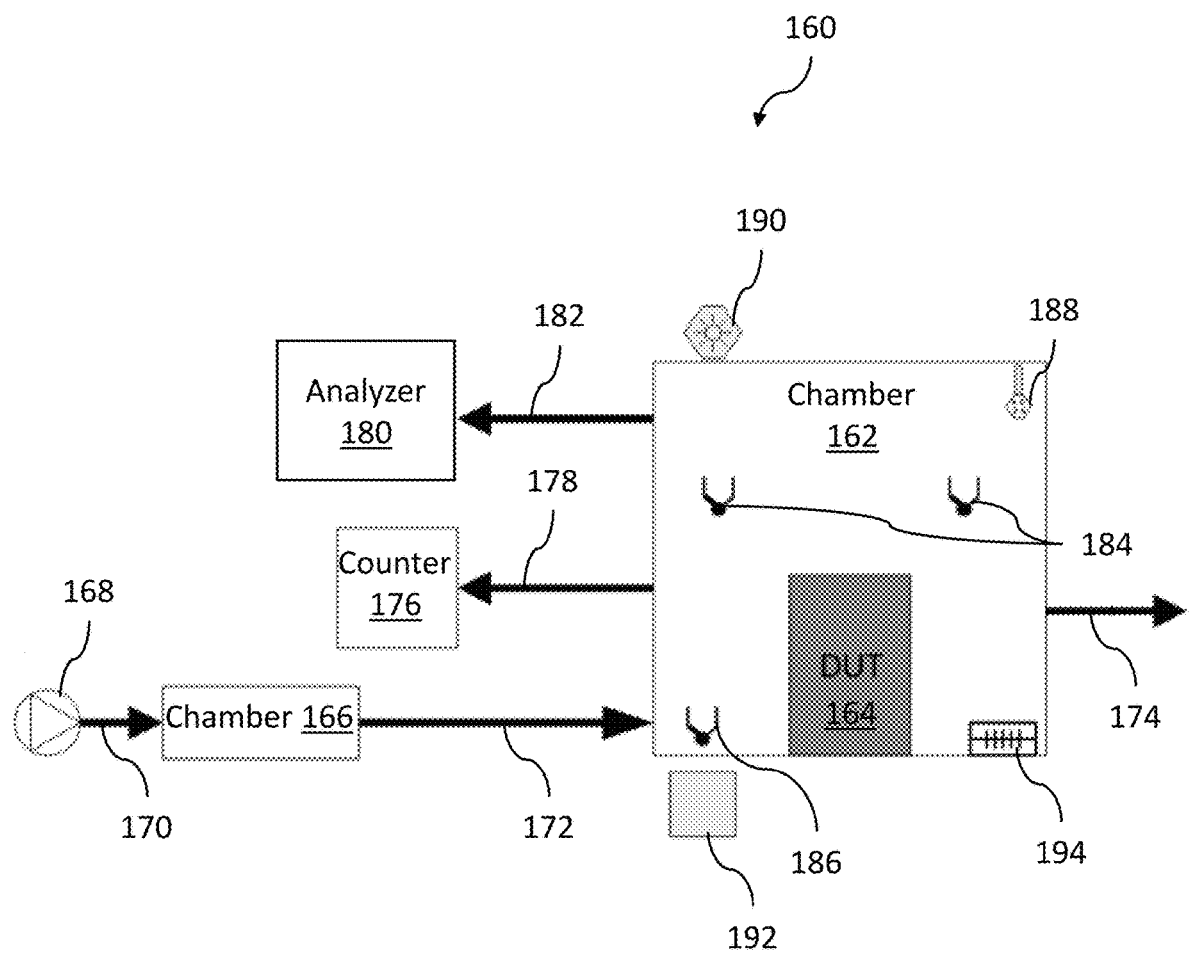
FIG. 1 is a diagrammatic view of an example wildfire smoke generation and electronic device testing apparatus, in embodiments.

FIG. 1 is a diagrammatic view of an example wildfire smoke generation and electronic device testing apparatus 100 in accordance with various embodiments described herein. The apparatus includes a chamber 166 configured to generate smoke from combustion of a combustible material within the chamber 166. The chamber 166 may be, for example, a pellet smoker or any other type of chamber capable of housing organic material for combustion to create smoke. Pellets, such as pulp wood pellets (e.g., oak, pine, or any other type of wood or mixture of wood), may be smoked or otherwise combusted in the chamber 166 to create smoke that has desired characteristics approximating wildfire smoke (e.g., with a desired particulate density and/or particulate matter of a desired size related to a particular type of desired type of wildfire smoke to test or simulate). For example, wildfire smoke may have particulate matter of sizes of anywhere from 0.08 to 0.75 µm, 0.35 to 0.75 µm, 0.12 to 0.26 µm, 0.23 to 0.35 µm, 0.08 to 0.2 µm, 0.1 to 0.14 µm, 0.24 to 0.36 µm, 0.25 to 0.3 µm, and/or 0.15 to 0.3 µm. Such particles may exist in smoke at varying concentrations, for example anywhere from 1,000 to 1,000,000 particles per $cm^3$, 14,000 to 34,000 particles per $cm^3$, 1,000 to 4,100 particles per $cm^3$, 8,000 to 47,000 particles per $cm^3$, 1,000 to 100,000 particles per $cm^3$, 14,000 to 42,000 particles per $cm^3$, 10,000 to 1,000,000 particles per $cm^3$, and/or 10,000 to 1,000,000 particles per $cm^3$. As such, any type of wildfire particle size and concentration, including the examples enumerated herein, may be duplicated using the various embodiments described herein.

A chamber 162 may be configured to house an electronic device 164 (e.g., a device under test (DUT) The chamber 166 and the chamber 162 are fluidly connected via a pipe 172. An air pump 168 is configured to move the smoke generated in the chamber 166 into the chamber 162. The air pump 168 may be fluidly connected to the chamber 166 via a pipe 170. While the air pump 168 is in operation, the electronic device 164 in the chamber 162 is exposed to the smoke generated in the chamber 166. The chamber 162 is further configured with an exhaust 174 such that the smoke generated in the chamber 166 moves through the chamber 162 and out of the chamber 162 via the exhaust 174.

The electronic device 164 may be removable from the chamber 162 so that after testing it may be removed and another device for testing may be put into the chamber 162. In various embodiments, multiple devices may be put in the chamber 162 for testing at the same time.

The chamber 162 further includes sensors to measure various conditions related to wildfire smoke and/or the operation of various electronic devices. For example, chamber 162 may include multiple thermocouples or temperature sensors 184 and 186, to measure temperature within the chamber 162. The apparatus 100 may further include other devices or sensors, such as at least one humidity sensor 188, at least one sensor 176 configured to measure at least one of particle size or a particle count in the smoke, at least one analyzer 180 for performing a chemical analysis of the smoke or particles therein, a light emitter 190 and a light receiver 192 configured to measure obscuration density of the smoke that moves through the chamber 162, and/or a sensor 194 configured to measure performance of the electronic device 164 and/or measure leakage of current through the electrical device 164 or sensor 194 during the testing of the electrical device 164.

Figure 2:
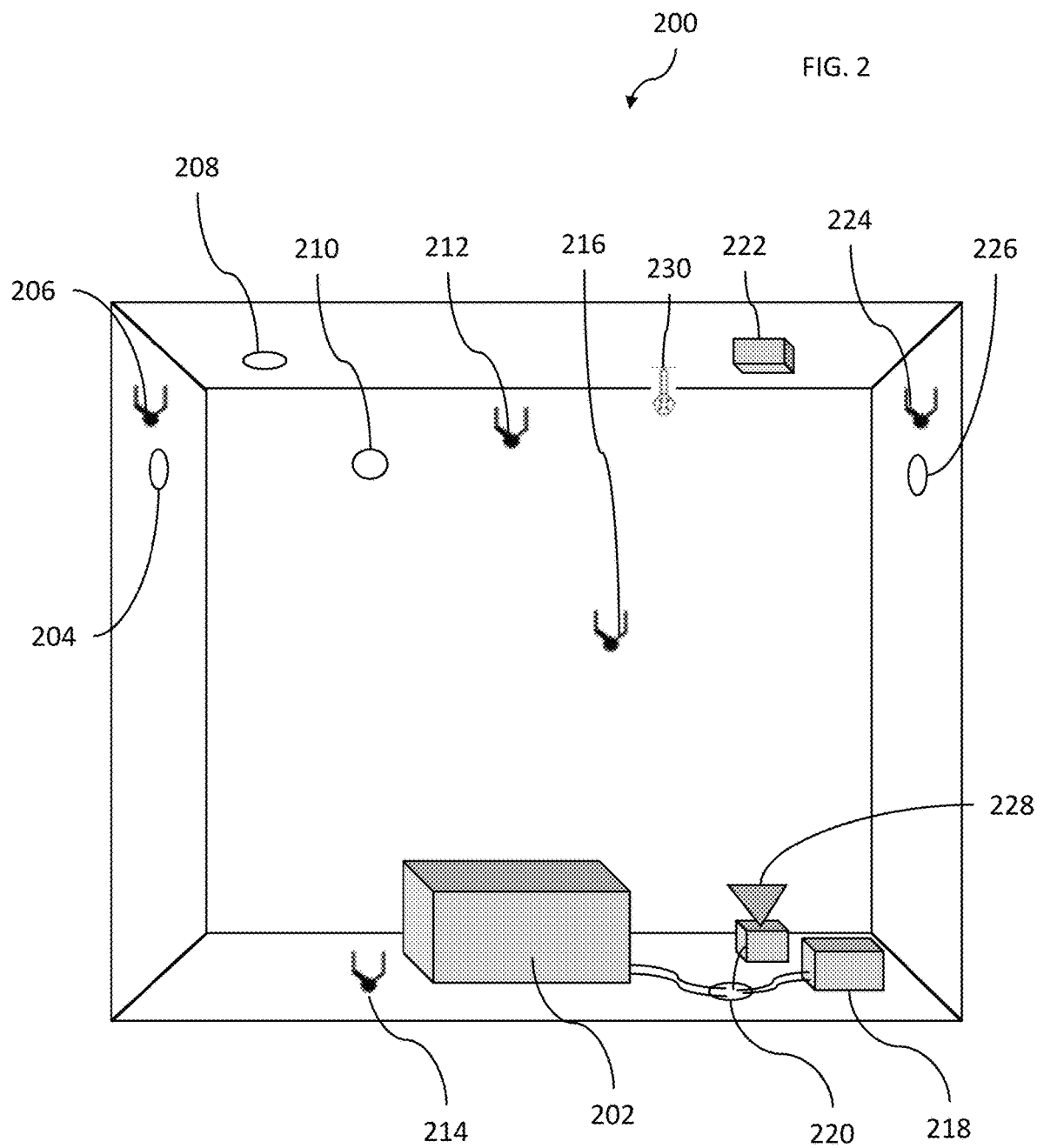
FIG. 2 is a diagrammatic view of an inside of a chamber used for smoke testing an electronic device, in embodiments.

FIG. 2 is a diagrammatic view of an inside of a chamber 200 used for smoke testing an electronic device 202. The chamber 200 may include various inlets/outlets 204, 208, 210, 226, and/or 220 that may be connected to a chamber for generating smoke, for connecting to various sensors or analysis devices, for inserting or coupling to exhaust pipes and/or entrance pipes for smoke, etc. In the example of FIG. 2, smoke may inlet at 204 and exit at 226. Openings 208 and 210 may be for various sensors or analysis devices to fluidly connect to the chamber for counting particles, measurement of size of particles, and/or analysis of particles in the smoke, for example. Thermocouples 206, 212, 216, 224, and/or 214 may be placed at different locations in the chamber 200, such as near the smoke inlet and/or outlet, near the electronic device 202, etc.

The chamber may further include at least one humidity sensor 230, a light emitter 228 and a light receiver 222 configured to measure obscuration density of the smoke that moves through the chamber 200, and/or a sensor 218 configured to measure performance of the electronic device 2020 and/or measure leakage of current through the electrical device 202 or sensor 218 during the testing. As shown in FIG. 2, an opening such as opening 220 may also be used to pass wiring into and/or out of the chamber 200, such as for connecting to the electrical device 202, the sensors, such as sensor 218, and/or the light emitter 228.

Figure 3:
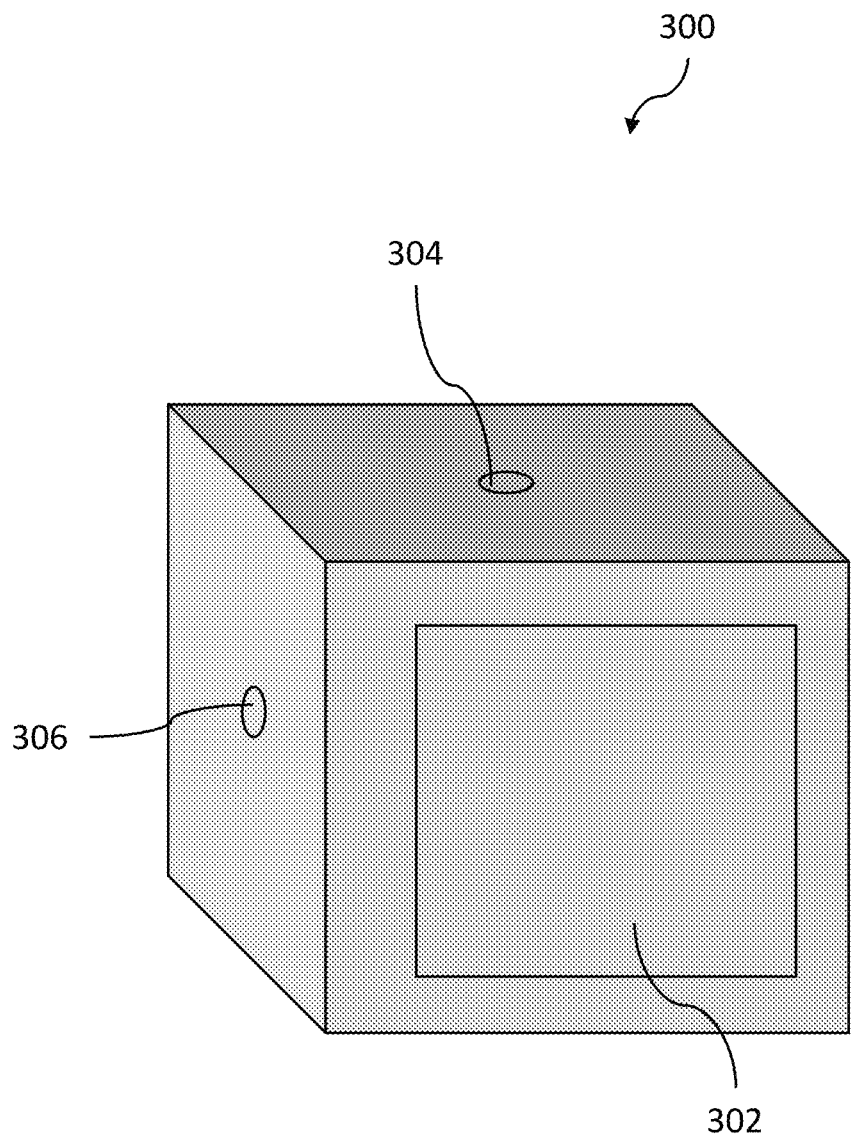
FIG. 3 is a diagrammatic view of an exterior of a chamber used for smoke testing an electronic device, in embodiments.

FIG. 3 is a diagrammatic view of an exterior of a chamber 300 used for smoke testing an electronic device. FIG. 3 shows example openings, inlets/outlets 306 and 304 that may be used to connect various sensors/analyzers and/or as smoke inlet/outlets. The chamber 300 also includes a door 302 that may be opened and closed to place or remove an electronic device inside. In this way, the inside of the chamber 300 is accessible, but may be sealed up when the door 302 is closed.

FIGS. 4A-D are diagrammatic views of a top, front, rear, and left side, respectively of a chamber used to generate smoke. FIG. 4A shows a top view, FIG. 4B shows a front view, FIG. 4C shows a rear view, and FIG. 4D shows the left side view of the chamber. A pump inlet 402 is shown in FIG. 4B to receive air from an air pump. A smoke outlet 404 is shown in FIG. 4C to output smoke to another chamber. An air inlet and ignition point 406 is shown in FIG. 4D so that the pellets inside may be ignited. In various embodiments, a manual igniter (e.g., lighter, torch, etc.) may be used, or an automatic igniter/starter may be used that may be controlled electronically (e.g., remotely by a computing device or control unit such as those described below with respect to FIGS. 6 and/or 10 herein).

FIG. 5 is a flow chart illustrating an example method 500 for generating smoke and exposing an electrical device to that smoke. At 502, combustible material (e.g., wood pellets) is placed into a first chamber. At 504, an electronic device is placed into a second chamber, where the first chamber and the second chamber are fluidly connected so that smoke may pass into the second chamber. At 506, the electronic device and/or any sensors may be powered on. At 508, the combustible material in the first chamber may be ignited to generate smoke from the combustible material.

At 510, an air pump is turned on to move the smoke from the first chamber to the second chamber. At 512, data is collected from at least one sensor in the second chamber while the air pump is on, and the air pump may be on for at least a predetermined amount of time for the test as desired. At 514, the air pump may be powered off to end the test, and at 516 the electronic device may be removed from the testing apparatus. When the electronic device is powered on and the air pump is on, performance of the electronic device may be measured. Various aspects of the electronic device may also be measured, before the test, while the air pump is turned on during the test and/or after the air pump is shut off after the test to see how the device was affected by the test. In other words, a baseline may be established by taking sensor measurements inside the first and/or second chambers before any smoke is created, including while the pump is off and/or while the pump is on. Then the sensors may continue to collect data while smoke is created, including while the pump is off and/or while the pump is on (e.g., depending on whether the pump is on the entire time that smoke is being created). The sensors may additionally or alternatively continue to collect data after a test is complete (e.g., after smoke is no longer being created and the air pump is on or off, while the air pump is still on but smoke is no longer being created or less smoke is being created, after a predetermined test time has passed, etc.). Various computing devices may also be used to receive and store data collected from one or more sensors in the chambers while smoke is circulated and the electronic device under test or otherwise associated with operation of the electronic device under test.

Figure 6:
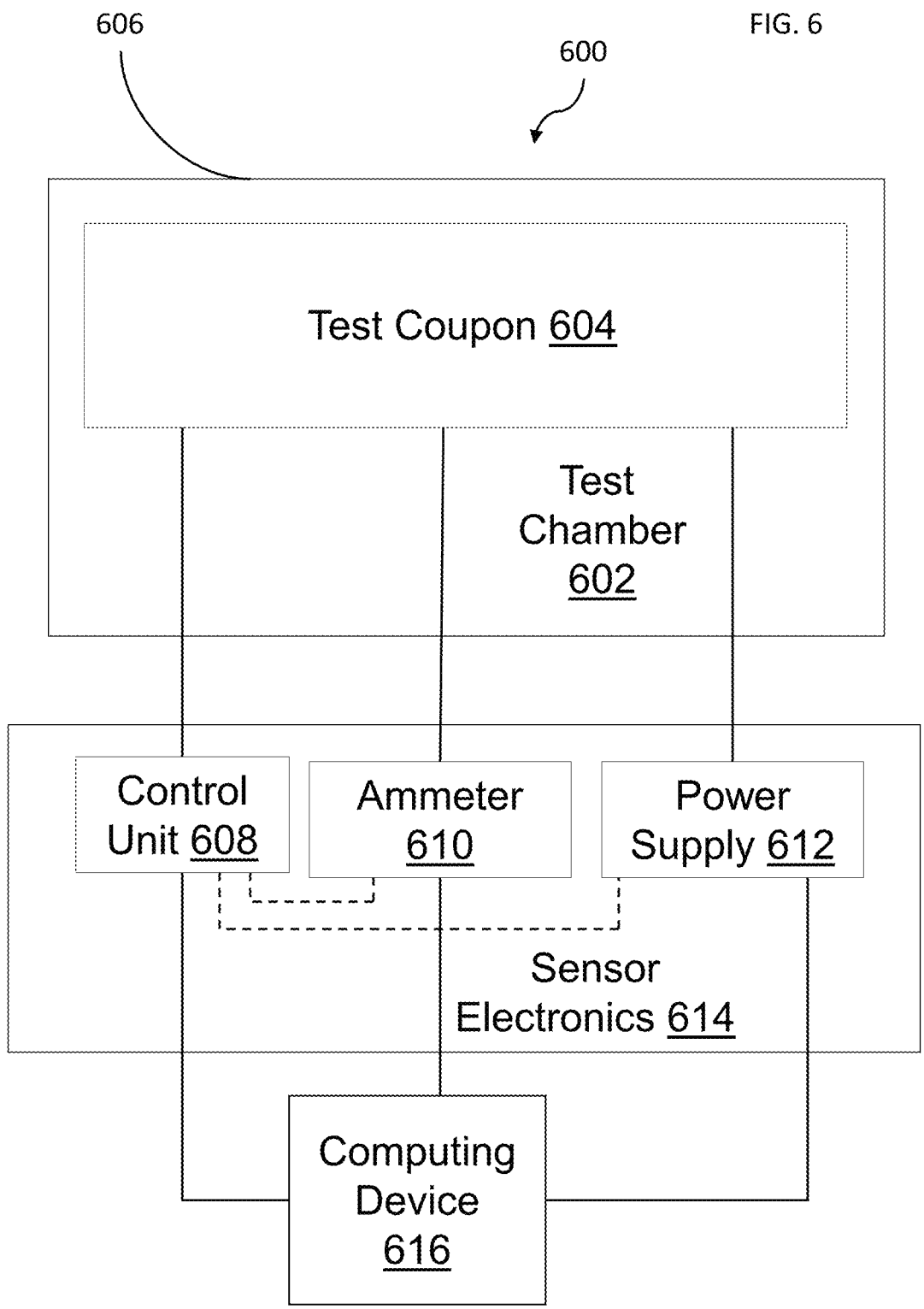
FIG. 6 is a diagrammatic view of an example electrical leakage device, in embodiments.

FIG. 6 is a diagrammatic view of an example system 600 including an electrical leakage device, which may be or may be similar to the sensor 194 or the sensor 218 of FIGS. 1 and 2, respectively. The system 600 may include a test coupon 604 that has exposed (e.g., non-insulated or non-sealed) electrical leads or wires thereon for transmitting electrical signals. The electrical leads or wires may be placed in close proximity to one another to approximate the spacing of leads or wiring that may be present on electronic device circuitry. For example, the test coupon 604 may include or may be a printed circuit board (PCB) on which electrically conductive leads are printed to simulate the spacing of leads of a particular circuit board or of particular circuitry of a given or standard computing device (e.g., switching circuits or PCBs used in data centers, circuits or PCBs used in servers or other components in data centers, circuits or PCBs used in telecommunications computing devices, etc.). The test coupon 604 may be placed in a test chamber 602. The test chamber 602 may be, for example, the chamber 162 of FIG. 1, the chamber 200 of FIG. 2, the chamber 300 of FIG. 3, or similar. As such, the test chamber 602 may be any chamber in which the test coupon 604 is exposed to test conditions (e.g., simulated wildfire smoke conditions). The test chamber 602 may be bounded by a shield 606, which may be walls and/or a door of the test chamber 602 (e.g., as shown in any of the chamber 162 of FIG. 1, the chamber 200 of FIG. 2, the chamber 300 of FIG. 3, or similar).

Wiring may pass from the test coupon 604 to sensor electronics 614 outside of the test chamber 602. For example, as shown in FIG. 2, wiring may pass from the sensor 218 to outside of the chamber 200. In various embodiments, some or all of the sensor electronics 614 may also be inside the test chamber 602. In such embodiments, the sensor electronics 614 may be sealed, insulated, or otherwise protected from the conditions inside the test chamber 602 (e.g., not exposed to the smoke generated and moved into a test chamber).

The sensor electronics 614 may include a control unit 608 (e.g., a controller or processor) for controlling the usage of the sensor (e.g., control how/when power is passed through the leads or wires on the test coupon 604) and/or measurements taken by the sensor. The sensor electronics may further include an ammeter 610 configured to measure aspects of the current being passed through the one or more leads or wires on the test coupon 604 (e.g., in amperes (A)). An example ammeter may have, for example, a resolution of 100 femtoamperes so as to detect very small changes in current through a given wire/lead that may be leaking during a test in which the wire/lead is exposed to smoke. For example, a Keithley 6478 pico-ammeter may be used in various embodiments. In various embodiments, other electrical aspects of the test coupon and electricity passing therethrough may be measured, such as resistance present in one or more wires/leads, voltage across one or more wires/leads or between different wires/leads of the test coupon 604, or any other aspect of electricity passing through the conductive portions of the test coupon 604. In various embodiments, this may be accomplished through use of any type of sensing device, such as an oscilloscope, multimeter, etc. In various embodiments, direct current (DC) and/or alternating current (AC) may be passed through the different wires/leads of the test coupon 604. As such, aspects of those particular types of current may also be measured, sensed, and/or recorded as desired. For example, with DC power, DC voltages may be measured, while for AC power amplitude, wavelength, etc. of the current flowing through one or more leads/wires on the test coupon 604 may be measured.

A power supply 612 may also be used to supply the current or power used to pass through the wires/leads of the test coupon 604. The control unit 608 may be used to control functionality of the test coupon 604 and may also be used to control the ammeter 610 and/or the power supply 612, as well as any other sensor electronics 614 that may be present in various embodiments.

The sensor electronics 614 may also be connected to a computing device 616. The computing device 616 may interact with the control unit 608 to control various aspects of the system 600, including the sensor electronics 614 and the test coupon 604. In various embodiments, the computing device 616 may be used instead of or in addition to the control unit 608 to control aspects of the sensor electronics 614 and/or the test coupon 604. The computing device 616 may also be used to collect and display data collected by other aspects of the system 600, such as the ammeter 610, the power supply 612, as well as any other sensors in the test chamber 602 (e.g., any of the other sensors or devices shown in and described with respect to FIGS. 1 and 2 that may be in a test chamber and/or smoke generating chamber, or any of the other sensors or components that may be located external to a chamber of a test system or apparatus. In other words, one or more computing devices such as the computing device 616 may be used to control any of the sensing devices, air pumps, ignition devices, etc. that are described herein, and may also be used to collect, display, save, and/or transmit data from any of the sensing devices, air pumps, chambers, etc. that are described herein.

Figure 7:
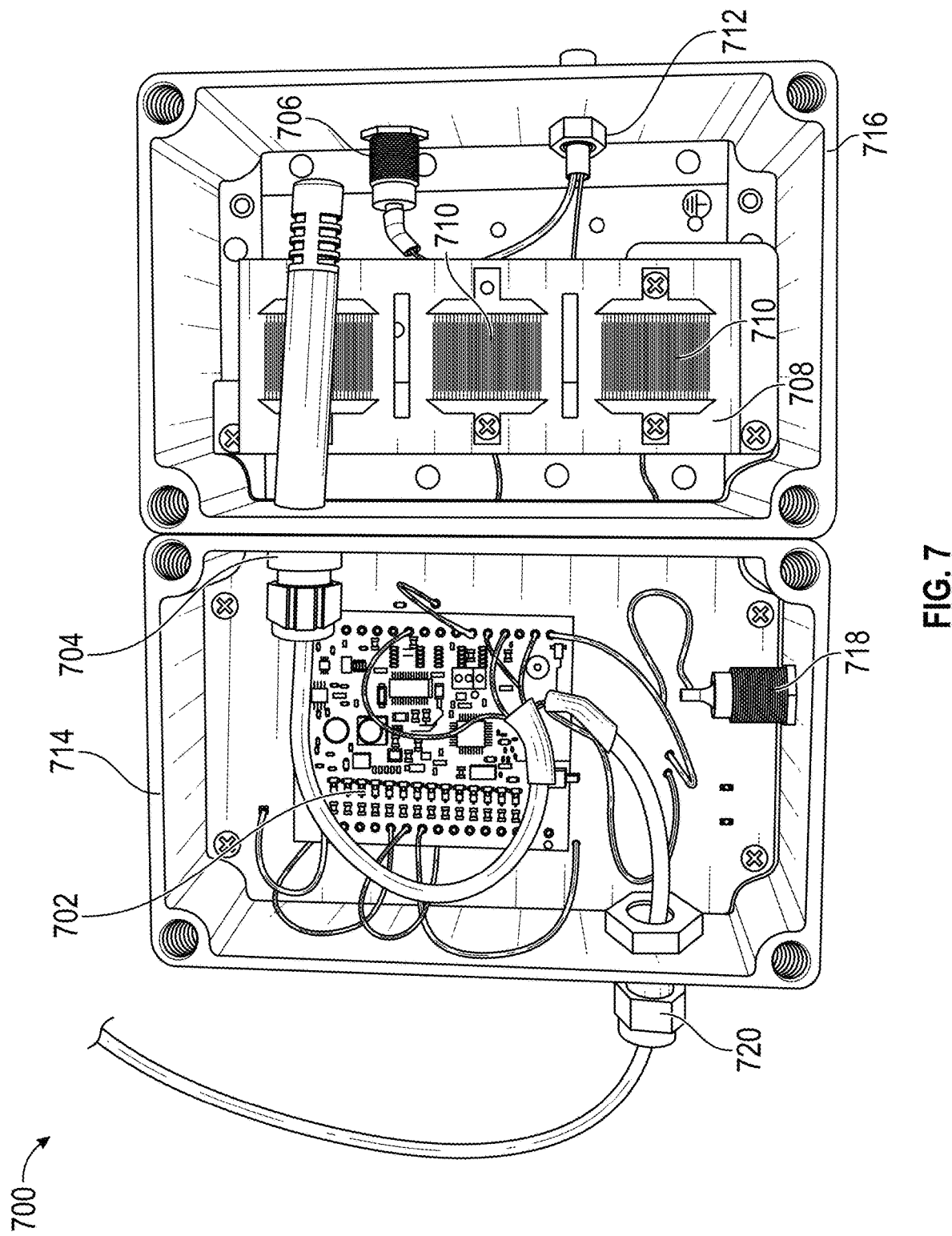
FIG. 7 is a diagrammatic view of an example electrical leakage device including test coupons on a printed circuit board, in embodiments.

FIG. 7 is a diagrammatic view of an example electrical leakage device 700 including test coupons 710 on a printed circuit board (PCB) 708, in embodiments. The electrical leakage device 700 includes a housing 716 in which the PCB 708 with test coupons 710 may be mounted. The housing 716 may be a test chamber or may be placed in a test chamber to expose the test coupons 710 to desired conditions (e.g., simulated wildfire smoke).

The housing 716 may include one or more opening 704 so that wiring may be passed between the housing 716 and a housing 714. Openings 706 and 718 may be used to connect components of the electrical leakage device 700 to positive and negative terminals of a power supply (e.g., 50 Volt power). An opening 712 may be used to pass a signal to an ammeter or other device (e.g., oscilloscope, multimeter, other sensors or circuitry, etc.) for measuring aspects of the power or current passing through the test coupons 710 before, during, and/or after the test coupons 710 are exposed to a desired test condition (e.g., simulated wildfire smoke). As shown in FIG. 7, the test coupons 710 and sensor electronics 702 to which they are connected may be in different housing 716 and 714, respectively. An opening 720 in the housing 714 may further connect the sensor electronics 702 to a computing device (e.g., through a universal serial bus (USB) port on a computing device). The sensor electronics 702 may include some or all of the components shown in and described with respect to the sensor electronics 614 of FIG. 6.

Figure 8:
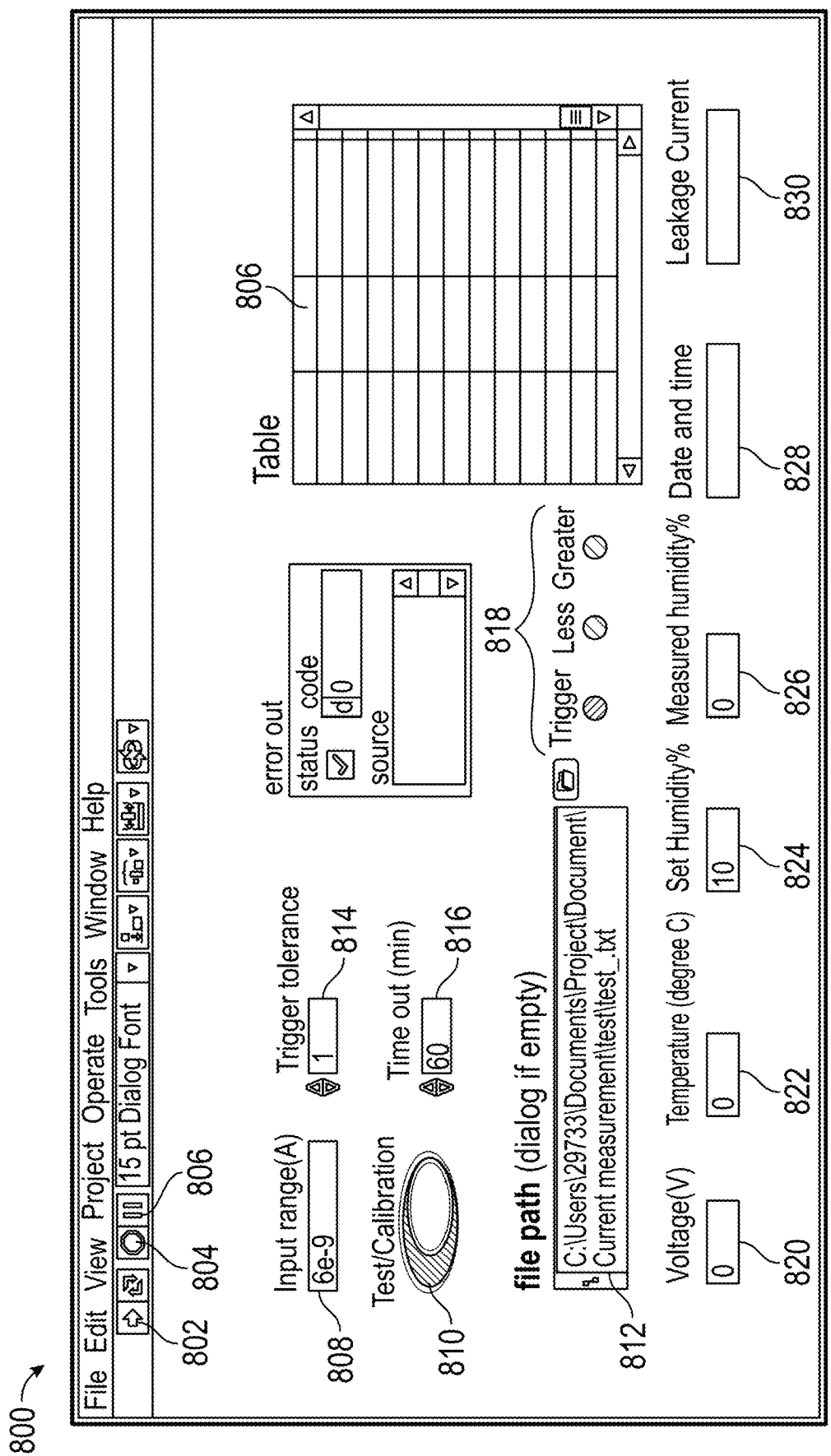
FIG. 8 is a diagrammatic view of a graphical user interface for collecting and displaying sensor data, in embodiments.

FIG. 8 is a diagrammatic view of a graphical user interface (GUI) 800 for collecting and displaying sensor data, in embodiments. The GUI 800 or some aspects of the GUI 800 may be used, for example, with any of the sensors described herein, such as the electrical leakage devices describe in and shown with respect to FIGS. 6 and 7. The GUI 800 may be displayed on a display of the computing device 616 of FIG. 6, for example, or any other computing device or display. The GUI 800 includes buttons 802, 804, and 806 for automatically controlling data collection of a given test. For example, the button 802 may be used to start data collection for a test, the button 804 may be used to stop data collection for a test, and the button 806 may be used to pause data collection for a test. Once the button 804 is selected, the test data collected may be saved in a test file, such as in a file path name specified in the dialog 812 of the GUI 800.

A toggle button 810 may be used to indicate whether the system is in test or calibration mode. For example, in a first position, a calibration mode may collect data from a test coupon while current is running through the test coupon (e.g., the test coupon 604 of FIG. 6 or the test coupons 710 of FIG. 7) but the test coupon is not being exposed to a desired test condition. In a second position, a test mode may collect data from the test coupon while current is running through the test coupon and the test coupon is exposed to a desired test condition (e.g., simulated wildfire smoke). As such, a system may be calibrated before testing.

A dialog 808 may be used to input text regarding how much current (e.g., Amperage) should be put through one or more test coupons. A dialog 814 may be used to input text for a trigger tolerance for a test. For example, one or more given conditions may be desired within a test chamber before a test (e.g., data collection) begins. The condition(s) may be any of, particle size for smoke, particle density, humidity, temperature, or any other condition desired within the test chamber. The trigger tolerance may set a tolerance for achieving that condition. For example, for a desired particle density level, a tolerance of plus or minus a certain amount may be set by the user in which the particle density level is determined to be with at the desired condition. A dialog 816 may be used to enter how long a test data collection is to last. Indicators 818 may indicate whether the trigger condition for beginning or maintaining a test condition(s) is at the desired level (e.g., within the trigger tolerance set in the dialog 814). The trigger light may be illuminated while the desired condition(s) is in the desired range, and the less or greater lights may be illuminated or otherwise change appearance if the desired condition(s) has fallen outside of a desired test condition range (e.g., as indicated by the trigger tolerance dialog 814). In various embodiments, a system may be configured to have multiple triggers. For example, the system may be configured to collect/record sensor data at predetermined time intervals, at predetermined intervals of a test condition (e.g., at different particle density levels, at different temperature levels, at different humidity levels, etc.).

Dialog 820 may be used to set or indicate a measured voltage applied to a test coupon or a voltage measured across a test coupon or between different leads/wires of a test coupon. Dialog 822 may be used to set or indicate a temperature inside a test chamber, inside a chamber where smoke is being generated, ambient temperature, and/or any other desired temperature being measured. Dialog 824 may be used to set or indicate a measured desired trigger condition. In the example of FIG. 8, humidity is the desired trigger condition that is desired to run a test, but as described herein that condition may also be any combination of, particle size for smoke, particle density, humidity, temperature, or any other condition desired within the test chamber. Dialog 826 may indicate a measured test condition within the test chamber. Dialog 828 may indicate a current date and time, which may also be recorded/stored along with test data received from various sensors, so that a table or other set of time-based data may be assembled and stored. Dialog 830 may indicate an amount of current leaking from the test coupon, between leads/wires of the test coupon, etc. as the test coupon is exposed to a test condition such as wildfire smoke. For example, as the leads or wires of a test coupon are exposed to wildfire smoke, electrically conductive particles from the smoke may come to rest on the wires/leads or in spaces between the wires/leads (e.g., on a PCB in between wires/leads). These particles may cause current leakage between wires/leads that were previously insulated from one another prior to being exposed to the smoke. As such, the test coupons and electrical leakage devices described herein may be used to measure if, when, and how much current may be leaking from one wire/lead to another as a test coupon is exposed to smoke and its associated particulate matter. A table 806 may display data as it is collected form the various sensors, and that data may be saved in a file specified in the dialog 812.

Test data recorded/received by a computing device may stored in different formats, files, etc. For example, the data may be stored in a database, text file (e.g., .txt), spreadsheet file (e.g., .xls), comma delimited file (e.g., csv), or any other format or file desired. As noted herein, the data may be collected over time, so the sensor data collected may have multiple data points listed along with the time at which that sensor data was collected. The computing device may also be programmed to plot this data into a graph, and display such a graph to a user via a display, such as on the GUI 800 or any other display. Such graphs may also be printed on paper. The test data and/or graphs collected/assembled may also be transmitted to another party for whom the test was run, a certification entity, etc., including to any computing devices associated with those parties or entities.

FIG. 9 is a flow chart illustrating an example method 900 for performing a test using an electrical leakage device, in embodiments. At 902, a test coupon may be mounted in a test chamber, such as the second chamber 162 of FIG. 1. An electrical leakage sensor and its associated electronics and/or computing device may be powered on at 904. At 906, a calibration may be performed to establish a baseline for a given test coupon and/or the electrical leakage sensor device as a whole. The test coupons may be changed out for each test, so variability in the test coupons themselves may be accounted for by calibration prior to running a test after a new test coupon is mounted in a test chamber.

At 908, data is collected from an electronic device (e.g., an electrical leakage sensor as described herein with respect to FIGS. 6-8) and/or other sensors as described herein during and/or after a test (e.g., during a test exposing the electronic device to smoke). At 910, a computing device that has received the sensor data may save the data from the sensor(s) and/or electronic device). At 912, the results/data may be analyzed, for example by determining that the electrical leakage of the test coupon or other electronic device under test is above a predetermined threshold (e.g., the device fails) or that the electrical leakage of the test coupon or other electronic device under test is below a predetermined threshold (e.g., the device passes). At 914, the test coupon may be removed from the test chamber. As described herein, the test coupon may have particulate matter from the smoke thereon, and therefore may be removed and disposed, making way for a new test coupon to mounted in the test chamber for a new test. In various embodiments, the removed test coupon may be cleaned or otherwise have the particulate matter coating the test coupon removed, so that the test coupon may be reusable. In such embodiments, a test or calibration may be performed on the test coupon after cleaning to ensure current leakage is below a predetermined threshold (e.g., to determine that the test coupon may actually be reused and has been sufficiently cleaned).

Accordingly, described herein are various systems, methods, apparatuses, and computer readable media for testing electronics by exposing the electronics to particulate matter of a desired concentration and size. In various embodiments, a chamber in which electronics are tested may be filled with other types of gases and/or particulates than just smoke that approximates a wildfire. For example, the chamber may also be filled with gases and/or particulates meant to approximate other conditions, such as different types of air pollution, smog, etc.

In various embodiments, any sensors or other electronic components described herein may output data to a computing device, such as that described herein with respect to FIG. 10, for example. For example, the computing device 616 and/or the control unit 608 of FIG. 6 may be or may be similar to the components shown in and described with respect to FIG. 10. The data may be recorded into memory, and organized electronically in the memory, such as in a database, table, etc. Data may also be analyzed, sorted, etc. by a computing device. The sensor data may also be displayed on a user interface of a computing device, in real time and/or after the data is already collected. In this way, the data for a given test may be recorded, analyzed, used, displayed, etc. as desired for documenting and interpreting a given test. Any of these functions may be accomplished using a computing device that is shown in and described with respect to FIG. 10 or may be accomplished using a similar computing device or any of the components of a computing device shown in and described with respect to FIG. 10. In various embodiments, the computing device may further be or may additionally include a network of computing devices that may communicate with one another, such as servers, cloud servers, other computing devices, etc. Various user interfaces, such as that shown in and described with respect to FIG. 8, may also be displayed on a display of a computing device or aspects of a computing device such as those shown in and described with respect to FIG. 10.

An example non-transitory computer readable medium having instructions stored thereon that, upon execution by a computing device, cause the computing device to perform operations including receiving and storing first data collected from one or more sensors in a first chamber while smoke is circulated through the first chamber. The instructions may further cause the computing device to perform operations including receiving and storing second data collected from a sensor of an electronic device under test or associated with operation of the electronic device under test in the first chamber. An air pump may be configured to move the smoke into the first chamber such that the electronic device under test is exposed to the smoke. The second data may be collected for at least a predetermined amount of time. The smoke may be generated from burning of a combustible material in a second chamber. The second chamber may be fluidly connected to the first chamber. The sensor of the electronic device under test or associated with operation of the electronic device may be configured to detect an electrical load on the electronic device under test during exposure of the electronic device under test to the smoke or detect leakage of current through the electronic device under test during exposure of the electronic device under test to the smoke. The one or more sensors may also be at least one of a temperature sensor, a humidity sensor, a light sensor, a particle size sensor, a particle count sensor, or a particle chemical analysis sensor.

FIG. 10 is a diagrammatic view of an example of a computing environment that includes a general-purpose computing system environment 100, such as a desktop computer, laptop, smartphone, tablet, or any other such device having the ability to execute instructions, such as those stored within a non-transient, computer-readable medium. Various computing devices as disclosed herein (e.g., the controller 174, a demand response module (DRM), or any other computing device in communication with the control 174) may be similar to the computing system 100 or may include some components of the computing system 100. Furthermore, while described and illustrated in the context of a single computing system 100, those skilled in the art will also appreciate that the various tasks described hereinafter may be practiced in a distributed environment having multiple computing systems 100 linked via a local or wide-area network in which the executable instructions may be associated with and/or executed by one or more of multiple computing systems 100.

In its most basic configuration, computing system environment 100 typically includes at least one processing unit 102 and at least one memory 104, which may be linked via a bus 106. Depending on the exact configuration and type of computing system environment, memory 104 may be volatile (such as RAM 110), non-volatile (such as ROM 108, flash memory, etc.) or some combination of the two. Computing system environment 100 may have additional features and/or functionality. For example, computing system environment 100 may also include additional storage (removable and/or non-removable) including, but not limited to, magnetic or optical disks, tape drives and/or flash drives. Such additional memory devices may be made accessible to the computing system environment 100 by means of, for example, a hard disk drive interface 112, a magnetic disk drive interface 114, and/or an optical disk drive interface 116. As will be understood, these devices, which would be linked to the system bus 306, respectively, allow for reading from and writing to a hard disk 118, reading from or writing to a removable magnetic disk 120, and/or for reading from or writing to a removable optical disk 122, such as a CD/DVD ROM or other optical media. The drive interfaces and their associated computer-readable media allow for the nonvolatile storage of computer readable instructions, data structures, program modules and other data for the computing system environment 100. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 100.

A number of program modules may be stored in one or more of the memory/media devices. For example, a basic input/output system (BIOS) 124, containing the basic routines that help to transfer information between elements within the computing system environment 100, such as during start-up, may be stored in ROM 108. Similarly, RAM 110, hard drive 118, and/or peripheral memory devices may be used to store computer executable instructions comprising an operating system 126, one or more applications programs 128 (which may include the functionality disclosed herein, for example), other program modules 130, and/or program data 122. Still further, computer-executable instructions may be downloaded to the computing environment 100 as needed, for example, via a network connection.

An end-user may enter commands and information into the computing system environment 100 through input devices such as a keyboard 134 and/or a pointing device 136. While not illustrated, other input devices may include a microphone, a joystick, a game pad, a scanner, etc. These and other input devices would typically be connected to the processing unit 102 by means of a peripheral interface 138 which, in turn, would be coupled to bus 106. Input devices may be directly or indirectly connected to processor 102 via interfaces such as, for example, a parallel port, game port, firewire, or a universal serial bus (USB). To view information from the computing system environment 100, a monitor 140 or other type of display device may also be connected to bus 106 via an interface, such as via video adapter 132. In addition to the monitor 140, the computing system environment 100 may also include other peripheral output devices, not shown, such as speakers and printers.

The computing system environment 100 may also utilize logical connections to one or more computing system environments. Communications between the computing system environment 100 and the remote computing system environment may be exchanged via a further processing device, such a network router 152, that is responsible for network routing. Communications with the network router 152 may be performed via a network interface component 154. Thus, within such a networked environment, e.g., the Internet, World Wide Web, LAN, or other like type of wired or wireless network, it will be appreciated that program modules depicted relative to the computing system environment 100, or portions thereof, may be stored in the memory storage device(s) of the computing system environment 100.

The computing system environment 100 may also include localization hardware 186 for determining a location of the computing system environment 100. In some instances, the localization hardware 156 may include, for example only, a GPS antenna, an RFID chip or reader, a WiFi antenna, or other computing hardware that may be used to capture or transmit signals that may be used to determine the location of the computing system environment 100.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An apparatus comprising:
   a first chamber configured to generate smoke from combustion of a combustible material within the first chamber;
   a second chamber configured to house an electronic device, wherein the first chamber and the second chamber are fluidly connected; and
   an air pump configured to move the smoke generated in the first chamber into the second chamber, wherein, while the air pump is in operation:
   the electronic device in the second chamber is exposed to the smoke generated in the first chamber, and
   the second chamber is further configured with an exhaust such that the smoke generated in the first chamber moves through the second chamber and out of the second chamber via the exhaust.

2. The apparatus of claim 1, wherein the first chamber comprises a pellet smoker configured to combust wood pellets.

3. The apparatus of claim 1, wherein at least one of oak or pine wood is ignited in the first chamber to generate smoke.

4. The apparatus of claim 1, wherein the electronic device is configured to be removable from the second chamber.

5. The apparatus of claim 1, wherein the electronic device is a first electronic device, and further wherein the second chamber is further configured to house a second electronic device.

6. The apparatus of claim 1, wherein the second chamber comprises at least one temperature sensor.

7. The apparatus of claim 1, wherein the second chamber comprises at least one humidity sensor.

8. The apparatus of claim 1, wherein the second chamber further comprises at least one sensor configured to measure at least one of particle size or a particle count in the smoke that moves through the second chamber.

9. The apparatus of claim 1, further comprising a particle analyzer fluidly connected to the second chamber and configured to determine a type of particle in the smoke that moves through the second chamber.

10. The apparatus of claim 1, wherein the second chamber further comprises a light emitter and a light receiver configured to measure obscuration density of the smoke that moves through the second chamber.

11. The apparatus of claim 1, further comprising a sensor configured to detect an electrical load on the electrical device during exposure of the electrical device to the smoke generated in the first chamber.

12. The apparatus of claim 1, further comprising a sensor configured to detect leakage of current through the electrical device during exposure of the electrical device to the smoke generated in the first chamber.

13. A method for exposing an electronic device to smoke to test the electronic device comprising:
    placing combustible material into a first chamber;
    placing the electronic device into a second chamber, wherein the first chamber and the second chamber are fluidly connected;
    igniting the combustible material in the first chamber to generate smoke from the combustible material;
    turning on an air pump to move the smoke from the first chamber to the second chamber; and
    collecting data from at least one sensor in the second chamber while the air pump is on, wherein the air pump is on for at least a predetermined amount of time for the test.

14. The method of claim 13, wherein the electronic device is powered on while the air pump is on.

15. The method of claim 13, further comprising measuring performance of the electronic device while the air pump is on.

16. The method of claim 13, wherein the electronic device is an optical electronic device.

17. The method of claim 13, further comprising measuring the at least one characteristic of the electronic device while the air pump is turned on during the test or after the air pump is shut off after the test.

18. The method of claim 17, further comprising measuring at least one characteristic of the electronic device before the air pump is turned on for the test.

* * * * *